United States Patent Office 3,086,021
Patented Apr. 16, 1963

3,086,021
TERTIARYAMINO BUTYNYL ALCOHOLS
John H. Biel, Milwaukee, Wis., assignor, by mesne assignments, to Lakeside Laboratories, Inc., Milwaukee, Wis., a corporation of Delaware
No Drawing. Filed Sept. 20, 1957, Ser. No. 685,091
10 Claims. (Cl. 260—268)

This invention is related to acetylene compounds. More particularly, it is concerned with novel 4-amino-2-butynes and methods of producing such compounds.

This application is a continuation-in-part of my application Serial No. 602,527, filed August 7, 1956 now abandoned.

There are provided according to the present invention novel 1,1-dicyclic-4-disubstituted amino-2-butyne-1-ol compounds of the formula

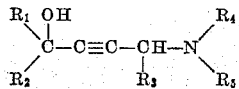

and acid addition and quaternary ammonium salts thereof, wherein $R_1$ is a phenyl or nuclear substituted phenyl group such as a lower alkoxy phenyl, lower alkyl phenyl, hydroxyphenyl or halophenyl group, or a thienyl, pyridyl, or lower cycloalkyl group such as cyclohexyl or cyclopentyl, and $R_2$ is a thienyl, pyridyl or furyl group, $R_3$ is hydrogen or a lower alkyl group and $R_4$ and $R_5$ are the same or different alkyl groups, preferably lower alkyls, aryl groups, preferably monocyclic aryl groups such as the phenyl group, aralkyl groups, preferably lower alkyl-monocyclic aryl groups like benzyl and phenethyl groups, alkenyl groups, preferably lower alkenyls such as the allyl group and groups in which $R_4$ and $R_5$ are joined to form a heterocyclic ring, preferably of 5 or 6 atoms in the ring such as pyrrolidino, piperidino, piperazino and morpholino.

These compounds, as the bases, may be conveniently produced by reacting an appropriate dicyclic ketone with a reactive metal salt, such as an alkali metal salt, of an appropriate tertiary aminopropyne. This process may be represented as follows:

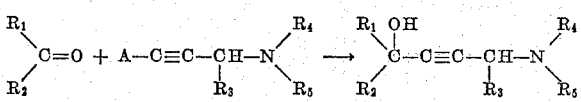

wherein A is a reactive metal and $R_1$, $R_2$, $R_3$, $R_4$ and $R_5$ have the significance assigned above.

Representative dicyclic ketones which may be employed in this reaction are 4-methoxyphenyl 2-thienyl ketone, 2-ethylphenyl 4-pyridyl ketone, 4-hydroxyphenyl 2-thienyl ketone, phenyl 2-thienyl ketone, cyclohexyl 2-thienyl ketone, cyclopentyl 2-thienyl ketone, phenyl 4-pyridyl ketone, phenyl furyl ketone and di-(2-thienyl) ketone.

Typical tertiary aminopropynes such as 3-dimethylamino-1-propyne, 3-diethylamino-1-propyne, 3-pyrrolidino-1-propyne, 3-N-morpholinyl-1-propyne, 3-piperidino-1-propyne, 3-diphenylamino-1-propyne, 3-diethylamino-3-methyl-1-propyne, and 3-dibenzylamino-1-propyne may be employed in the reaction in the form of reactive metal salts such as the alkali metal salts. The sodium salts are readily prepared by reacting the propynyl-amine with sodamide at the reflux temperature of an inert solvent such as benzene.

The reaction is preferably carried out by contacting the reactants in the presence of an inert solvent, such as benzene or toluene, and employing an elevated temperature, such as the reflux temperature, to effect reaction in a convenient amount of time. The desired product may be recovered from the reaction mixture by conventional procedures such as cooling the mixture as over ice and filtering off the product.

Some typical novel compounds produced by this method are 1-phenyl-1-(4-pyridyl)-4-diethylamino-2-butyne-1-ol,
1-(4-hydroxyphenyl)-1-(3-pyridyl)-4-pyrrolidino-2-butyne-1-ol,
1-phenyl-1-(2-thienyl)-4-morpholino-2-butyne-1-ol,
1-phenyl-1-furyl-4-dimethylamino-2-butyne-1-ol,
1-phenyl-1-(4-pyridyl)-4-pyrrolidino-2-butyne-1-ol,
1-phenyl-1-(2-thienyl)-4-dimethylamino-2-butyne-1-ol,
1-phenyl-1-(2-thienyl)-4-diethylamino-2-butyne-1-ol,
1-phenyl-1-(2-thienyl)-4-pyrrolidino-2-butyne-1-ol,
1-cyclohexyl-1-(2-thienyl)-4-diethylamino-2-butyne-1-ol,
1-cyclohexyl-1-(2-thienyl)-4-pyrrolidino-2-butyne-1-ol,
1-cyclopentyl-1-(2-thienyl)-4-diethylamino-2-butyne-1-ol,
1-cyclopentyl-1-(2-thienyl)-4-pyrrolidino-2-butyne-1-ol,
1-phenyl-1-(4-pyridyl)-4-dimethylamino-2-butyne-1-ol,
1,1-(4-pyridyl)-4-diethylamino-4-ethyl-2-butyne-1-ol,
1,1-bis(2-thienyl)-4-pyrrolidino-2-butyne-1-ol and
1-cyclohexyl-1-(2-thienyl)-4-(4'-methylpiperazino)-2-butyne-1-ol.

Acid addition salts of these and other such compounds as are included within the scope of this invention may be produced by contacting the compound with a suitable acid such as a mineral acid like sulfuric acid or hydrochloric acid or organic acids like maleic acid, fumaric acid, acetic acid and citric acid.

Quaternary ammonium salts may also be readily prepared by contacting the compounds with alkyl and aralkyl esters of mineral and organic acids, preferably in the presence of a suitable organic solvent. Alkyl halides such as methyl bromide, ethyl iodide, methyl sulfate, benzyl chloride and propargyl bromide are representative compounds that may be used to form quaternary ammonium salts.

In the form of non-toxic acid addition salts the novel amino butynols are sedative and diuretic agents. The non-toxic quaternary ammonium salts of these compounds are potent gastric anti-secretory agents useful in the therapy of peptic ulcer; in addition, they are potent antispasmodics, useful in relieving disturbances of the digestive tract.

The following examples illustrate specific embodiments of the invention, but it is to be understood that these examples are for illustration only and are not to be considered as restricting the invention.

EXAMPLE 1

*1-Cyclohexyl-1 (2-Thienyl)-4-Dimethylamino-2-Butyne-1-ol*

To 7.8 g. (0.2 mole) of sodamide in 75 cc. of benzene was added 17 g. (0.2 mole) of dimethylamino propyne and the mixture heated at reflux for 1 hour. Then 38 g. (0.2 mole) of cyclohexyl 2-thienyl ketone was added and the mixture refluxed for 6 hours. It was poured over ice and the solid which formed collected on a filter. The product was recrystallized from hot n-hexane. M.P. 135–136° C.; 51 g. (93%).

*Analysis.*—Calcd. $C_{16}H_{23}NOS$: 5.05% N; 11.55% S. Found: 4.83% N; 11.45% S.

EXAMPLE 2

By following the procedure of Example 1 and employing the appropriate reactants, the bases of Table 1 were prepared.

TABLE 1

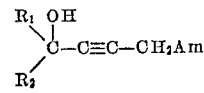

$$\begin{array}{c} R_1 \;\; OH \\ \phantom{R_1}\diagdown \;| \\ \phantom{R_1}\phantom{\diagdown}C-C\equiv C-CH_2Am \\ \phantom{R_1}\diagup \\ R_2 \end{array}$$

| R₁ | R₂ | Am | M.P., °C. | Yield, percent | Calcd. Percent N | Calcd. Percent S | Found Percent N | Found Percent S |
|---|---|---|---|---|---|---|---|---|
| Phenyl | 2-thienyl | —N(CH₃)₂ | 134–136 | 74 | 5.19 | 11.85 | 5.08 | 11.99 |
| Do | do | —N(C₂H₅)₂ | 85–88 | 84 | 4.69 | 10.74 | 4.32 | 10.84 |
| Do | do | Pyrrolidino | 126–127 | 80 | 4.71 | 10.77 | 4.74 | 10.25 |
| Cyclohexyl | do | —N(CH₃)₂ | 135–136 | 93 | 5.05 | 11.55 | 4.83 | 11.45 |
| Do | do | —N(C₂H₅)₂ | 78–80 | 87 | 4.59 | 10.49 | 4.57 | 10.48 |
| Do | do | Pyrrolidino | 81–82 | 81 | 4.62 | 10.56 | 4.33 | 10.99 |
| Cyclopentyl | do | —N(CH₃)₂ | | 85 | 5.32 | 12.16 | (¹) | (¹) |
| Do | do | —N(C₂H₅)₂ | | 86 | 4.81 | 10.99 | (¹) | (¹) |
| Do | do | Pyrrolidino | | 90 | 4.84 | 11.07 | (¹) | (¹) |
| Phenyl | 4-pyridyl | —N(CH₃)₂ | 96–98 | 95 | 10.52 | | 10.18 | |

¹ Bases not isolated.

In Table 2 there is set forth various data concerning quaternary ammonium salts of typical bases that have been prepared.

TABLE 2

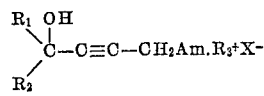

$$\begin{array}{c} R_1 \;\; OH \\ \phantom{R_1}\diagdown \;| \\ \phantom{R_1}\phantom{\diagdown}C-C\equiv C-CH_2Am \cdot R_3^+ X^- \\ \phantom{R_1}\diagup \\ R_2 \end{array}$$

| R₁ | R₂ | R₃ | Am | X | M.P. °C | Yield, percent | Calcd. Percent N | Calcd. Percent S | Calcd. Percent X | Found Percent N | Found Percent S | Found Percent X |
|---|---|---|---|---|---|---|---|---|---|---|---|---|
| Phenyl | 2-thienyl | CH₃— | —N(CH₃)₂ | Br | 202–203 | 89 | 3.82 | 8.74 | 21.85 | 3.85 | 8.85 | 22.17 |
| Do | do | CH₃— | —N(C₂H₅)₂ | Br | 160–161 | 87 | 3.55 | 8.12 | 20.30 | 3.57 | 8.16 | 20.69 |
| Do | do | CH₃— | Pyrrolidino | I | 143–144 | 94 | 3.19 | 7.29 | 28.93 | 3.04 | 7.24 | 30.05 |
| Cyclohexyl | do | CH₃— | —N(CH₃)₂ | I | 175–177 | 93 | 3.34 | 7.63 | 30.31 | 3.79 | 7.54 | 29.47 |
| Do | do | CH₃— | —N(C₂H₅)₂ | I | 166–168 | 90 | 3.13 | 7.16 | 28.41 | 2.93 | 7.20 | 28.14 |
| Do | do | CH₃— | Pyrrolidino | I | 146–148 | 94 | 3.15 | 7.19 | 28.53 | 2.95 | 7.22 | 28.51 |
| Cyclopentyl | do | CH₃— | —N(CH₃)₂ | I | 150–152 | 80 | 3.45 | 7.90 | 31.35 | 3.27 | 7.97 | 30.48 |
| Do | do | CH₃— | —N(C₂H₅)₂ | I | 110–112 | 85 | 3.23 | 7.39 | 29.33 | 3.01 | 7.53 | 28.96 |
| Do | do | CH₃— | Pyrrolidino | I | 105–107 | 86 | 3.25 | 7.42 | 29.46 | 3.08 | 7.42 | 29.61 |

Table 3 sets forth data for bifumarate and fumarate salts of typical bases provided by this invention.

TABLE 3

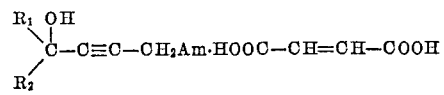

$$\begin{array}{c} R_1 \;\; OH \\ \phantom{R_1}\diagdown \;| \\ \phantom{R_1}\phantom{\diagdown}C-C\equiv C-CH_2Am \cdot HOOC-CH=CH-COOH \\ \phantom{R_1}\diagup \\ R_2 \end{array}$$

["Bifumarate"]

| R₁ | R₂ | Am | M.P., °C. | Yield, percent | Calcd. Percent N | Calcd. Percent S | Found Percent N | Found Percent S |
|---|---|---|---|---|---|---|---|---|
| Cyclopentyl | 2-thienyl | —N(CH₃)₂ | 125–126 | 83 | 3.69 | 8.44 | 3.06 | 8.26 |
| Do | do | —N(C₂H₅)₂ | 120–123 | 89 | 3.44 | 7.86 | 3.36 | 7.12 |
| Do | do | Pyrrolidino | 130–132 | 90 | 3.46 | 7.90 | 3.35 | 7.83 |

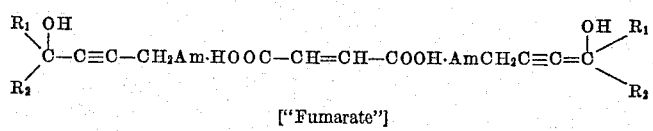

["Fumarate"]

| $R_1$ | $R_2$ | Am | M.P., °C. | Yield, percent | Calcd. Percent N | Calcd. Percent S | Found Percent N | Found Percent S |
|---|---|---|---|---|---|---|---|---|
| Phenyl | 2-thienyl | $-N(CH_3)_2$ | 195–196 | 90 | 4.24 | 9.69 | 4.24 | 9.68 |
| Do | do | pyrrolidino | 175–177 | 91 | 3.94 | 9.01 | 3.86 | 8.69 |
| Do | 4-pyridyl | $-N(CH_3)_2$ | 216–217 | 92 | 8.33 | | 8.28 | |

Example 3

1-Cyclohexyl-1-(α-Thienyl)-4-(4'-Methyl-Piperazino)-2-Butyn-1-ol

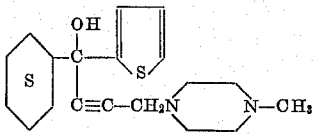

Cyclohexyl 2-thienyl ketone was reacted with 3-(4'-methylpiperazino)-1-propyne as the sodium salt as in Example 1 to form this compound.

M.P. 133–135° C. *Analysis.*—Calcd. for $C_{19}H_{28}N_2OS$: N, 8.43; S, 9.63. Found: N, 8.15; S, 9.64.

The mono-methiodide salt melted at: 190–192° C. *Analysis.*—Calcd. for $C_{20}H_{31}IN_2OS$: N, 5.90; S, 6.75; I, 26.79. Found: N, 5.62; S, 6.64; I, 27.25.

The dimethiodide salt melted at: 204–206° C. *Analysis.*—Calcd. for $C_{21}H_{34}I_2N_2OS$: N, 4.56; S, 5.21; I, 41.36. Found: N, 4.23; S, 5.07; I, 40.87.

The mono-fumarate salt melted at: 168–169° C. *Analysis.*—Calcd. for $C_{23}H_{32}N_2O_5S$: N, 6.05; S, 7.14. Found: N, 5.85; S, 6.74.

Various changes and modifications of the invention can be made and, to the extent that such variations incorporate the spirit of this invention, they are intended to be included within the scope of the appended claims.

What is claimed is:

1. A member of the group consisting of compounds of the formula

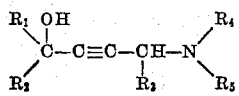

and non-toxic acid addition and non-toxic quaternary ammonium salts thereof, wherein $R_1$ is a member of the group consisting of phenyl, lower alkoxy phenyl, lower alkyl phenyl, hydroxyphenyl, halophenyl, thienyl, pyridyl, and lower cycloalkyl groups, $R_2$ is a member of the group consisting of thienyl, pyridyl, and furyl, $R_3$ is a member of the group consisting of hydrogen and lower alkyl groups, and $R_4$ and $R_5$ are members of the group consisting of lower alkyl, phenyl, phenyl-lower alkyl and lower alkenyl groups, and groups in which $R_4$ and $R_5$ are joined to form a heterocyclic ring of the group consisting of pyrrolidino, morpholino, piperidino and piperazino groups.

2. 1-phenyl-1-(2-thienyl)-4-dimethylamino-2-butyne-1-ol.
3. 1-phenyl-1-(2-thienyl)-4-diethylamino-2-butyne-1-ol.
4. 1-phenyl-1-(2-thienyl)-4-pyrrolidino-2-butyne-1-ol.
5. 1-cyclohexyl-1-(2-thienyl)-4-diethylamino-2-butyne-1-ol.
6. 1-cyclohexyl-1-(2-thienyl)-4-pyrrolidino-2-butyne-1-ol.
7. 1-cyclopentyl-1-(2-thienyl)-4-diethylamino-2-butyne-1-ol.
8. 1-cyclopentyl-1-(2-thienyl)-4-pyrrolidino-2-butyne-1-ol.
9. 1-cyclohexyl-1-(α-thienyl)-4-(4'-methylpiperazino)-2-butyne-1-ol.
10. 1-phenyl-1-(4-pyridyl)-4-dimethylamino-2-butyne-1-ol.

References Cited in the file of this patent

UNITED STATES PATENTS

| | | |
|---|---|---|
| 2,680,115 | Ruddy et al. | June 1, 1954 |
| 2,782,191 | Reppe et al. | Feb. 19, 1957 |

OTHER REFERENCES

Fieser et al.: Organic Chemistry, pages 86–87, second edition, 1950.